P. JACOBSEN.
SEALING APPARATUS FOR WRAPPERS.
APPLICATION FILED MAY 10, 1915.
1,155,929.
Patented Oct. 5, 1915.
2 SHEETS—SHEET 1.
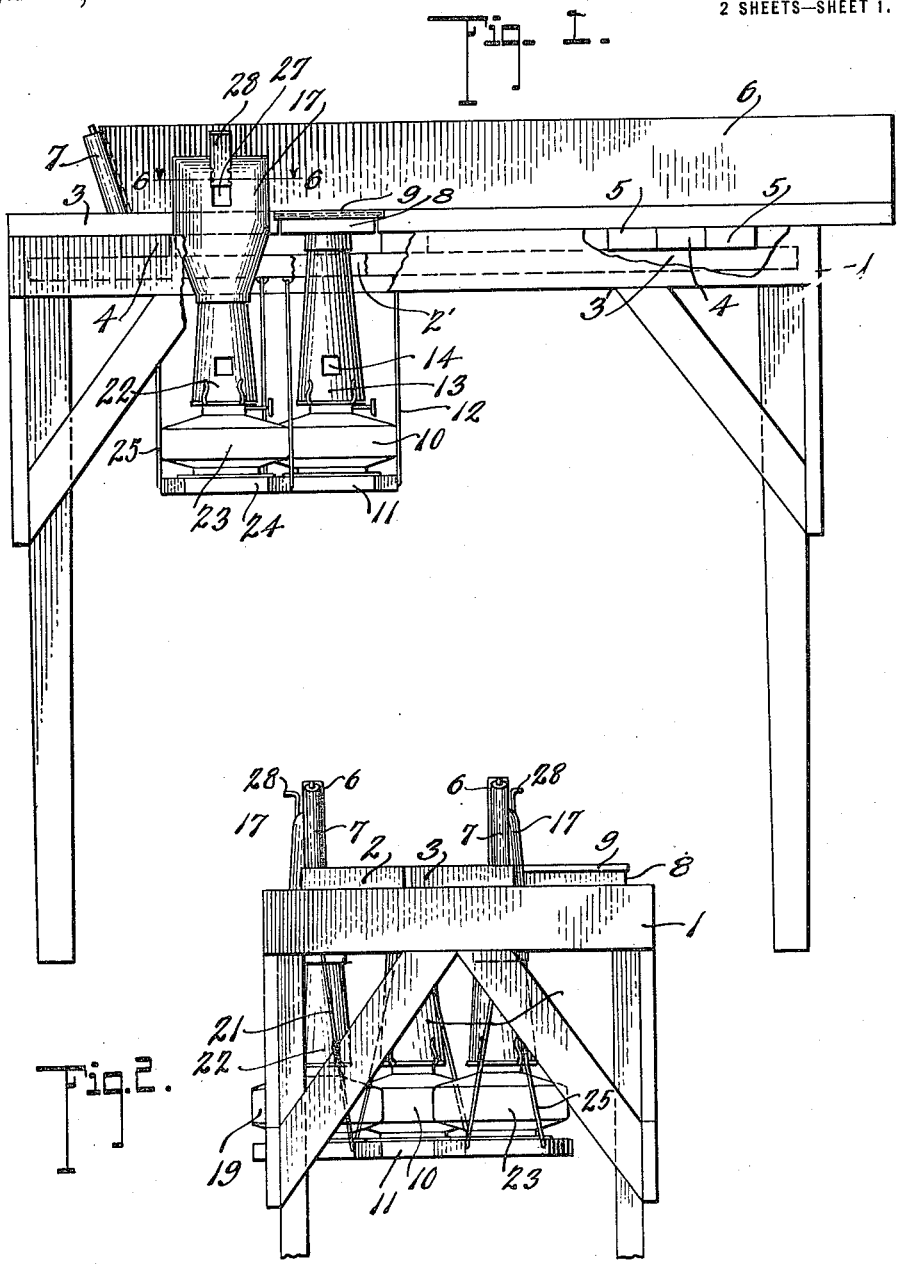
Inventor
Peter Jacobsen
Witness
E.H.Wagner.
By Robb & Robb
Attorneys

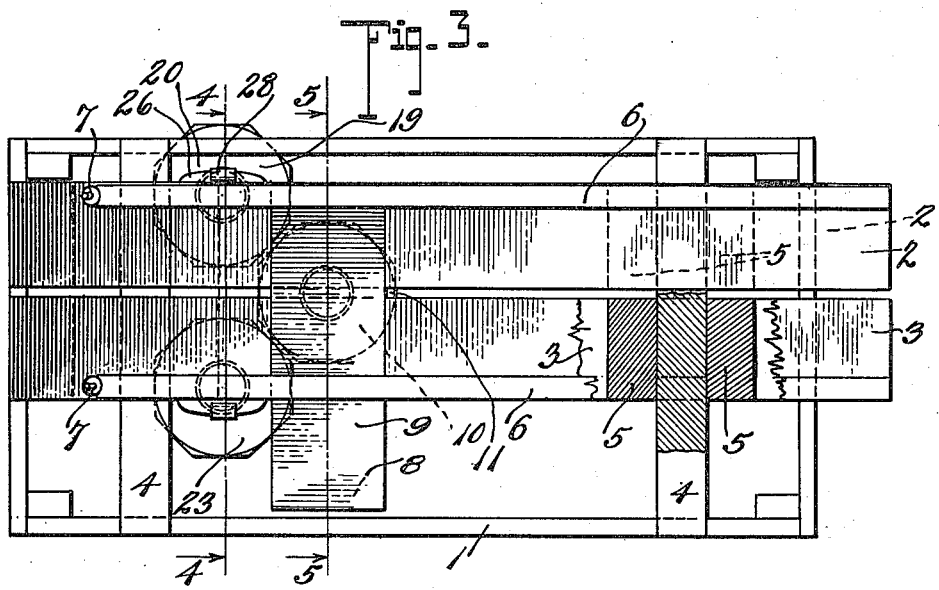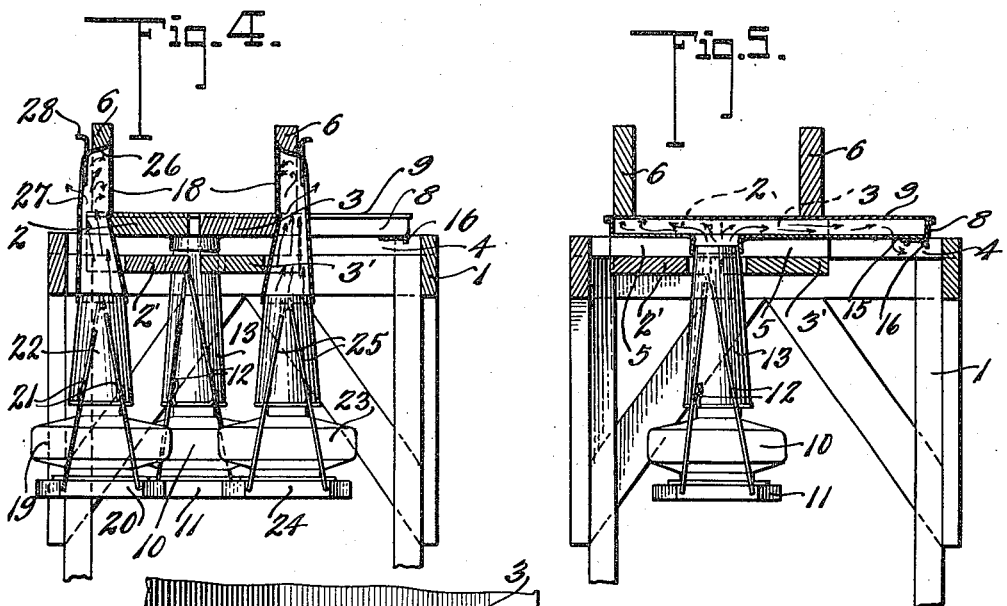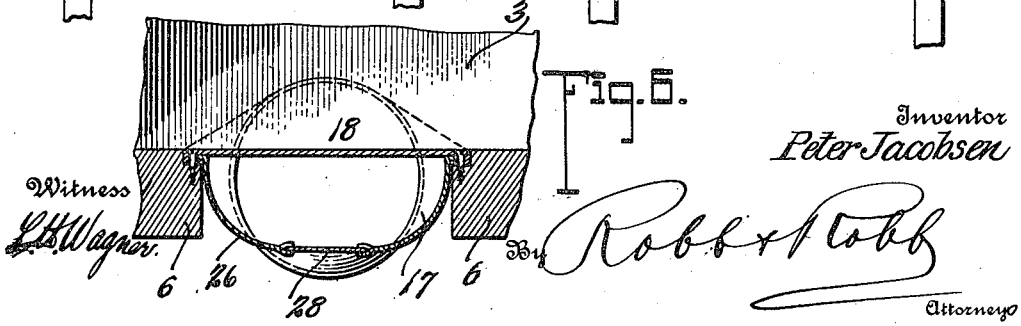

UNITED STATES PATENT OFFICE.

PETER JACOBSEN, OF PERTH AMBOY, NEW JERSEY.

SEALING APPARATUS FOR WRAPPERS.

1,155,929.  Specification of Letters Patent.  Patented Oct. 5, 1915.

Application filed May 10, 1915. Serial No. 27,187.

*To all whom it may concern:*

Be it known that I, PETER JACOBSEN, a citizen of the United States, residing at Perth Amboy, in the county of Middlesex and State of New Jersey, have invented certain new and useful Improvements in Sealing Apparatus for Wrappers, of which the following is a specification.

The present invention appertains to improvements in sealing devices for wrappers, such as used in connection with bread and other articles, for maintaining such articles in sanitary condition.

The object of my invention is to provide a simple apparatus capable of being cheaply manufactured and involving heat supplying elements of a conventional type which supply heat to heat retaining chambers comprising radiating plates which coöperate with the wrappers to be sealed in carrying out the functions of the apparatus.

A further object is to provide means for adequately controlling the heat in the chambers aforesaid, such means constituting valves for permitting escape of products of combustion from the heat supplying elements.

These and such other objects as may hereinafter appear are attained by the novel construction, combination, and arrangement of parts to be hereinafter specifically described and claimed.

Reference will now be had to the accompanying drawings forming a part of this specification, wherein:

Figure 1 is a side elevation of an apparatus constructed in accordance with my invention. Fig. 2 is an end elevation of the same. Fig. 3 is a top plan view thereof, parts being broken away and shown in section to more clearly disclose the details of construction. Fig. 4 is a transverse sectional view on the line 4—4 of Fig. 3. Fig. 5 is a transverse sectional view on the line 5—5 of Fig. 3; and Fig. 6 is a horizontal sectional view on the line 6—6 of Fig. 1.

Throughout the following detail description, and on the several figures of the drawings, similar parts are referred to by like reference characters.

Specifically describing the invention and referring to the drawings, 1 designates a suitable support or table upon which is removably disposed the sealing apparatus comprising the essential features of my invention. This apparatus consists of horizontal supporting members 2 and 3, which members are adapted to receive the articles to be operated upon and which members are also adjustable with relation to each other to accommodate articles of different sizes as will be hereinafter more particularly set forth.

The members 2 and 3 may be of any desired material such as wooden planks, the former relatively fixed, while the latter is capable of adjustment to and from the member 2. The supporting section 2 is connected to spaced guide members 4 which are removably positioned transversely of the frame or table 1 hereinbefore mentioned. The sections 2 and 3 include corresponding lower elements 2', 3' extending beneath the cross bars 4 and being secured to the respective sections 2 and 3 through the instrumentality of the spaced guides 5 arranged at each side of each of the transverse bars 4. Obviously the section 3 is adjustable laterally on the bars 4 with respect to the section 2, as when it is desired to operate upon bread or other wrapped articles of different lengths.

Projecting upwardly from the sections 2 and 3 are corresponding side members 6 between which the articles are moved in the process of sealing the wrappers. At the forward end of each of these side members is located a folding roller 7, said roller being positioned at an incline as best disclosed in Fig. 1 of the drawing. Arranged transversely of the sections 2 and 3, and secured fixedly to the former is an elongated heating chamber 8, provided with a heating plate or cover 9 which is preferably of aluminum or similar heat retaining material. This chamber, and its cover plate, of course, is of sufficient length to allow of the maximum adjustment of the section 3 and the compartment is arranged at a point intermediate the lengths of the said sections 2 and 3. At a convenient point directly beneath the chamber 8 is disposed a lamp or other suitable heat supplying member 10 which is disposed upon a platform or support 11 suspended from the member 2' by means of the hanging wires 12. The lamp is provided with a chimney 13 having a sight window 14 at one side, which chimney communicates or extends into the chamber 8 so as to supply heat to said chamber for action upon the heating plate 9 thereof.

Adjacent to the outer end of the chamber 8 is provided an opening 15 through which the products of combustion from the lamp 10 are permitted to escape. Coöperating with the opening 15 is a valve or closure means 16 which is designed to regulate the escape of the heat from the chamber 8 in an obvious manner, thereby controlling the temperature of the heating plate 9. Each of the side members 6 is similarly provided with a heating chamber 17, said chambers having heating plates 18 flush with the inner walls of the side members and located in advance of the heating plate 9 for the chamber 8. A lamp 19 carried upon a platform or support 20 suspended from the member 2' by the wires 21 supplies heat to one of the chambers 17 with which its chimney 22 communicates and another lamp 23 similarly supported by a platform 24 suspended from the element 3' by the wires 25 supplies heat to the other side chamber 18. It will be noted by reference particularly to Fig. 4 of the drawing that the chambers 17 are of special construction in that each is provided with a deflecting portion 26 adjacent to its top and slightly above a lateral opening 27. The opening 27 is provided with a closure member or valve 28 for regulating the operative area of said opening in a manner similar to that described with reference to the opening of the chamber 8. Obviously the heat from the lamps beneath the side chambers will tend to remain in the compartments and to affect the temperature of the heating plates 18 by reason of the deflecting portion 26 just described, the products of combustion and excess heat passing out through opening 27 located at a point opposite the lowermost portion of the plates 18.

In the broader phases of the invention, it will be obvious that an effective control is provided by the use of heating instrumentalities of the character hereinbefore described, the lamps employed being capable of adjustment in the conventional manner so as to regulate the amount of heat which said lamp generates. In other words, to increase the heat the burner is turned up and to decrease it the burner is turned down, and independent of this adjustment the amount of heat which is retained by the chambers is controlled by the valves or slide members hereinbefore described which more or less regulate the operative area of the openings in the respective heating chambers. This affords a dual control which is independent with respect to each of the heating compartments.

The operation of the apparatus will be readily understood though it may be mentioned that the bread or similar article is wrapped with paraffin or waxed paper at one end of the sections 2 and 3, the end flaps being folded into proper position by the rollers 7 as the article is moved between the side members 6. The contact of the ends of the article with the heating plates 18 causes the paraffined edges or end surfaces of the wrapper to adhere to each other and the further movement of the article along the supports 2 and 3 brings the bottom of said article on to the heating plate 9 whereupon the edges of the wrapper are caused to adhere in a similar manner, effectively sealing the contents. While under ordinary conditions the sealing operation is carried out as above described, it is sometimes desirable to discontinue the sealing of the bottom portion. The lamp for the compartment 8 may be rendered inoperative and this will permit the ends of the package only to be sealed allowing the access of air to the contents of the package as when the weather is warm and there is a possibility of molding of the heated bread in the course of time.

The apparatus comprehended by this invention is simple in structure and may readily be employed in all localities since it employs heating means of a very conventional type.

Slight changes may be made in the details of construction and arrangement of parts, without departing from the spirit of the invention, and within the scope of the claims hereto appended.

Having thus described my invention, what I claim as new is:

1. Sealing apparatus for wrappers comprising a support, guide means for the wrapped articles carried by said support, heating means disposed in said support and guide means, and comprising chambers, one wall of each of which constituting a heating plate, means for supplying heat to the chambers, and means for regulating the amount of heat retained by said chambers, said means comprising a valved opening disposed adjacent to the bottom of each chamber in the wall thereof opposite to its heating plate.

2. Sealing apparatus for wrappers comprising a support, guide means for the wrapped articles carried by said support, heating means disposed in said support and guide means, and comprising chambers, one wall of each of which constituting a heating plate, means for supplying heat to the chambers, means for regulating the amount of heat retained by said chambers, said means comprising a valved opening disposed adjacent to the bottom of each chamber in the wall thereof opposite to its heating plate, the walls of certain of said heating chambers having the valve opening, being formed with a deflecting portion for directing the heat supply to said chambers against its respective heating plate.

3. Sealing apparatus for wrappers comprising a support consisting of adjustable sections, guide means arranged on said sections, a lateral heating chamber, vertically disposed in each of the guide means and having its inner wall constituting a heating plate, valve means adjacent to the lower portion of each of said lateral chambers for controlling the amount of heat to be retained thereby, a horizontally disposed heating chamber arranged transversely of the support and having its upper wall constituting a heating plate, a valve opening arranged in the bottom of said horizontal chamber at a point most remote from the source of heat therefor, and means for supplying heat to each of said chambers, the operative area of the heating plate of the horizontal chamber being controlled by the adjustment of the sections aforesaid.

4. Sealing apparatus for wrappers comprising a support, consisting of longitudinally separable sections, a relatively stationary heating chamber arranged transversely on said sections and provided with a heating plate, the operative area of said plate being subject to control by adjustment of the separable sections, side members carried by said sections, heating chambers arranged in said side members and each provided with a heating plate, means in said side chambers for maintaining heat supplied thereto effective upon its heating plate, a source of heat for said chambers, and means for regulating the heat to be retained by said chambers.

5. Sealing apparatus for wrappers comprising a support, consisting of separable sections, a heating chamber arranged on said sections and provided with a heating plate, side members carried by said sections, heating chambers arranged in said side members and each provided with a heating plate, means in said side chambers for maintaining heat supplied thereto effective upon its heating plate, independent heat supplying elements communicating with each of said chambers adjustable to control the quantity of heat supplied thereto, and valve means for controlling the amount of heat to be retained by said chambers.

In testimony whereof I affix my signature.

PETER JACOBSEN.